United States Patent [19]
Chatterjee et al.

[11] Patent Number: 6,022,628
[45] Date of Patent: *Feb. 8, 2000

[54] RANDOM COPOLYMER COMPOSITIONS

[75] Inventors: Ananda Mohan Chatterjee; Randolph Neil Campbell, both of Katy, Tex.

[73] Assignee: Union Carbide Chemicals & Plastics Technology Corporation, Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/909,385

[22] Filed: Aug. 11, 1997

Related U.S. Application Data

[63] Continuation of application No. 08/704,518, filed as application No. PCT/US94/13309, Nov. 18, 1994, abandoned.

[51] Int. Cl.$^7$ ...................................................... B32B 27/32
[52] U.S. Cl. ........................... 428/523; 428/461; 526/128; 526/124.9; 526/125.2; 526/125.3; 526/348.1; 526/348.6; 524/128; 524/241; 524/287; 524/436
[58] Field of Search .................................... 524/128, 241, 524/287, 436; 526/128, 124.9, 125.2, 125.3, 348.1, 348.6; 428/523, 461

[56] References Cited

U.S. PATENT DOCUMENTS

| | | | |
|---|---|---|---|
| 4,380,567 | 4/1983 | Shigemoto | 428/213 |
| 5,110,671 | 5/1992 | Balloni et al. | 428/218 |
| 5,635,557 | 6/1997 | Kimura et al. | 524/493 |
| 5,922,471 | 7/1999 | Chatterjee | 428/461 |

FOREIGN PATENT DOCUMENTS

| | | |
|---|---|---|
| 1199140 | 1/1986 | Canada . |
| 0577407 | 1/1994 | European Pat. Off. . |
| 4011160 | 10/1991 | Germany . |
| 59-149909 | 8/1984 | Japan . |
| 63-291906 | 11/1988 | Japan . |
| 3031344 | 1/1991 | Japan . |
| 4288353 | 10/1992 | Japan . |
| 2105651 | 3/1983 | United Kingdom . |

*Primary Examiner*—David W. Wu
*Assistant Examiner*—Caixia Lu-Rutt
*Attorney, Agent, or Firm*—P. A. Doody; P. W. Leuzzi

[57] ABSTRACT

A polymer composition having improved balanced mechanical and optical properties comprising (i) a random copolymer comprising from about 0.8% to about 20% by weight of butene-1 and from about 80% to about 99.2% by weight of propylene, and (2) from about 0%–0.35% by weight of polymer composition of a synthetic amorphous silica anti-block agent.

20 Claims, No Drawings

RANDOM COPOLYMER COMPOSITIONS

This application is a Continuation of prior U.S. application: Ser. No. 08/704,518 Filing Date May 21, 1996, now abandoned and/which is a 371 Filing of PCT application PCT/US94/13309 Nov. 18, 1994 and/which claims priority to U.S. applications 157,787 and 161,552, both filed Nov. 23, 1993 both abandoned.

TECHNICAL FIELD

This invention relates to compositions comprising random copolymers of propylene and butene-1 having improved optical properties suitable for the preparation of film having a low hexane extractables content. This invention also relates to random copolymers of propylene and butene-1 suitable for the preparation of oriented film having good tensile properties and excellent optical properties, such as low haze and low yellowing.

BACKGROUND ART

Polyolefin polymers compositions have gained wide acceptance and usage in numerous commercial applications because of the relatively low cost of the polymers and the desirable properties they exhibit. Such commercial applications include plastic film, such as cast and oriented films. The plastic film can be used for food and commercial product packaging, containers for food, and medical devices such as syringes. It is very important for materials used as packaging for foods, medical devices, and other commercial products, that the presence or absence of impurities or foreign substances such as refuse or the like in the contents of a container can be externally confirmed. It is not desirable that the color tint of the contents be changed when it is observed through the container. For this reason, it is desired to use a polymer composition of high transparency, high gloss and good color, in these fields. Moreover, in recent years, the film industry is requesting polymer compositions with improved tensile properties in order to facilitate processability.

In an attempt to provide homopolymer products capable of withstanding commercial stretching ratios, it is known to adjust the amorphous or solubles content of the homopolymer from about 4.2% weight (% wt) to about 6.0% wt. The tensile strength of these increased amorphous containing polymers is still low relative to ethylene random copolymers. Ethylene randoms containing 0.3% to 0.7% by weight of ethylene are typically used to obtain a good balance between processability and mechanical properties for oriented propylene film. Incorporation of ethylene in amounts greater than 0.5% weight tends to result in a softer product having a low tensile modulus. Further, ethylene random films tend to show visible signs of aging such as a "grease" or "bloom" layer developing on the surface of the film which adversely effects the clarity of the film.

Antiblock agents have been typically used in polymer films to prevent the blocking (or sticking together) of the polymer film. However, these antiblock agents have an adverse effect on the optical properties such as haze and gloss of the polymer film.

Low hexane extractables content copolymer is very desirable because the U.S. Food and Drug Administration ("FDA") has specific solubles requirements that polyolefin copolymers must satisfy in order to be used for food or medical applications. As noted previously, ethylene random copolymers are typically used for food and medical packaging. However, ethylene randoms may require an additional washing step during manufacture to meet the FDA hexane extractables limits.

It would be of advantage to provide improved random copolymers, and films thereof including a process for producing the improved copolymers, having an improved balance of good optical properties such as low haze, low blooming, good color, low yellowing, and low hexane extractables, low xylene solubles levels, improved tensile strength and high stiffness.

DISCLOSURE OF THE INVENTION

The present invention relates to a polymer composition having improved balanced mechanical and optical properties. More particularly, the present invention provides a polymer composition comprising (i) a random copolymer comprising from about 0.8% to about 20% by weight of butene-1 and from about 80% to about 99.2% by weight of propylene, and (2) from about 0%–0.35% by weight of the polymer composition of a synthetic amorphous silica antiblock agent having a bulk density in the range from about 300 to about 360 gm/liter and an oil absorption in the range from about 80 to about 100 gm/100 gm; wherein the polymer composition has:

(a) a hexane extractable at 50° C. of up to 5.5%, according to 21 C.F.R. 177.1520(C)(3.2), (b) a haze, as measured by ASTM D-1003, of up to 5%, (c) a xylene soluble level at 23° C. of up to 13%, as measured according to 21 C.F.R. 177.1520, (d) a tensile modulus of at least 40,000 (100,000) psi according to ASTM D882 (1% secant at 0.05 inches/min), and (e) an elongation at break, as measured according to ASTM D882, in the range of 80% to 2000%.

The invention also provides a process for producing the random copolymer composition in the presence of a high activity stereoregular catalyst system obtained by contacting (i) an olefin polymerization procatalyst with (ii) an organoaluminum cocatalyst and (iii) a selectivity control agent.

Further, the invention relates to film product that comprises an oriented substrate layer of the random copolymer composition and a polymeric layer on at least one surface of the random copolymer substrate layer. The invention also provides a metallized random copolymer film.

BEST MODE FOR CARRYING OUT THE INVENTION

The polymer resin compositions of the present invention can be obtained by polymerizing propylene and butene-1 under polymerization conditions in the presence of a titanium-based, olefin polymerization catalyst system, such as a magnesium, titanium-containing polymerization catalyst system. Such polymerization catalyst systems are typically obtained by the combination of a titanium halide-based catalyst component, an organoaluminum compound and one or more electron donors. For convenience of reference, the solid titanium-containing catalyst component is referred to herein as "procatalyst", the organoaluminum compound, as "cocatalyst", and the electron donor compound, which is typically used separately as "selectivity control agent" (SCA).

Although a variety of chemical compounds are useful for the production of the procatalyst, a typical procatalyst of the invention is prepared by halogenating a magnesium compound of the formula MgR'R", wherein R' is an alkoxide or aryloxide group and R" is an alkoxide, hydrocarbyl carbonate, aryloxide group or halogen, with a halogenated tetravalent titanium compound in the presence of a halohydrocarbon and an electron donor.

The magnesium compound employed in the preparation of the solid catalyst component contains alkoxide, aryloxide, hydrocarbyl carbonate or halogen. The alkoxide, when present generally contains from 1 to 10 carbon atoms. Alkoxide containing from 1 to 8 carbon atoms is preferable, with alkoxides of 2 to 4 carbon atoms being more preferable. The aryloxide, when present generally contains from 6 to 10 carbon atoms, with 6 to 8 carbon atoms being preferred. The hydrocarbyl carbonate, when present generally contains 1 to 10 carbon atoms. When halogen is present, it is preferably present as bromine, fluorine, iodine or chlorine, with chlorine being more preferred.

Suitable magnesium compounds are magnesium chloride, ethoxy magnesium bromide, isobutoxy magnesium chloride, phenoxy magnesium iodide, magnesium fluoride, cumyloxy magnesium bromide, magnesium diethoxide, magnesium isopropoxide, magnesium stearate, magnesium ethyl carbonate and naphthoxy magnesium chloride. The preferred magnesium compound is magnesium diethoxide.

Halogenation of the magnesium compound with the halogenated tetravalent titanium compound is typically effected by using an excess of the titanium compound. At least 2 moles of the titanium compound should ordinarily be used per mole of the magnesium compound. Preferably from 4 moles to 100 moles of the titanium compound are used per mole of the magnesium compound, and most preferably from 8 moles to 20 moles of the titanium compound are used per mole of the magnesium compound.

Halogenation of the magnesium compound with the halogenated tetravalent titanium compound can be effected by contacting the compounds at an elevated temperature in the range from about 60° C. to about 150° C., preferably from about 70° C. to about 120° C. Usually the reaction is allowed to proceed over a period of 0.1 to 6 hours, preferably from about 0.5 to about 3.5 hours. The halogenated product is a solid material which can be isolated from the liquid reaction medium by filtration, decantation or other suitable method.

The halogenated tetravalent titanium compound employed to halogenate the magnesium compound usually contains at least two halogen atoms, and preferably contains four halogen atoms. The halogen atoms are chlorine atoms, bromine atoms, iodine atoms or fluorine atoms. The halogenated tetravalent titanium compound thus has up to two alkoxy or aryloxy groups. Examples of suitably halogenated tetravalent titanium compounds include alkoxy titanium halides, diethoxytitanium dibromide, isopropoxy-titanium triiodide, dihexoxytitanium dichloride, and phenoxytitanium trichloride, titanium tetrahalides such as titanium tetrachloride and titanium tetrabromide. The preferred halogenated tetravalent titanium compound is titanium tetrachloride.

Suitable halohydrocarbons, which may be present, include aromatic or aliphatic, including cyclic and alicyclic compounds. Preferably the halohydrocarbon contains 1 or 2 halogen atoms, although more may be present if desired. It is preferred that the halogen is, independently, chlorine, bromine or fluorine. Exemplary of suitable aromatic halohydrocarbons are chlorobenzene, bromobenzene, dichlorobenzene, dichlorodibromobenzene, o-chlorotoluene, chlorotoluene, dichlorotoluene, chloronaphthalene. Chlorobenzene, o-chlorotoluene and dichlorobenzene are the preferred halohydrocarbons, with chlorobenzene and o-chlorotoluene being more preferred.

The aliphatic halohydrocarbons which can be employed suitably have 1 to 12 carbon atoms. Preferably such halohydrocarbons have 1 to 9 carbon atoms and at least 2 halogen atoms. Most preferably the halogen is present as chlorine. Suitable aliphatic halo hydrocarbons include dibromomethane, trichloromethane, 1,2-dichloroethane, trichloroethane, dichlorofluoroethane, hexachloroethane, trichloropropane, chlorobutane, dichlorobutane, chloropentane, trichloro-fluorooctane, tetrachloroisooctane, dibromodifluorodecane. The preferred aliphatic halohydrocarbons are carbon tetrachloride and trichloroethane.

Aromatic halohydrocarbons are preferred, particularly those of 6 to 12 carbon atoms, and especially those of 6 to 10 carbon atoms.

Suitable inert hydrocarbon diluents include aromatic hydrocarbons such as toluene, o-xylene, m-xylene, p-xylene, benzene, ethylbenzene, propylbenzene such as isopropylbenzene or cumene, trimethylbenzene and the like which are liquid at normal temperature.

The electron donors which are suitably included within the procatalyst can be the conventional electron donors employed in titanium-based olefin polymerization procatalysts including ethers, esters, ketones, amines, imines, nitriles, phosphines, stibines, arsines and alcoholates. The preferred electron donors are esters and particularly aliphatic esters of aromatic monocarboxylic or dicarboxylic acids. Examples of such preferred electron donors are methyl benzoate, ethyl benzoate, ethyl p-ethoxybenzoate, ethyl p-methylbenzoate, diethyl phthalate, dibutylphthalate, diisobutyl phthalate, diisopropyl terephthalate and dimethyl naphthalene-dicarboxylate. The electron donor is a single compound or a mixture of two or more compounds but preferably the electron donor is provided as a single compound. Of the preferred ester electron donors, ethyl benzoate and diisobutyl phthalate are particularly preferred. Sufficient electron donor should be provided so that the molar ratio of electron donor to magnesium in the procatalyst is from about 0.002 to about 0.3. It is preferred that the molar ratio of electron donor to magnesium in the procatalyst is from about 0.03 to about 0.2, with a ratio from about 0.03 to 0.16 being more preferred.

After the solid halogenated product has been separated from the liquid reaction medium, it can be treated one or more times with additional halogenated tetravalent titanium compound. Preferably, the halogenated product is treated multiple times with separate portions of the halogenated tetravalent titanium compound. Better results are obtained if the halogenated product is treated twice with separate portions of the halogenated tetravalent titanium compound. As in the initial halogenation, at least 2 moles of the titanium compound should ordinarily be employed per mole of the magnesium compound, and preferably from 4 moles to 100 moles of the titanium compound are employed per mole of the magnesium compound, most preferably from 4 moles to 20 moles of the titanium compound per mole of the magnesium compound.

The reaction conditions employed to treat the solid halogenated product with the titanium compound are the same as those employed during the initial halogenation of the magnesium compound.

Optionally, the solid halogenated product is treated at least once with one or more acid chlorides after washing the solid halogenated product at least once with additional amounts of the halogenated tetravalent titanium compound. Suitable acid chlorides include benzoyl chloride and phthaloyl chloride. The preferred acid chloride is phthaloyl chloride.

After the solid halogenated product has been treated one or more times with additional halogenated tetravalent titanium compound, it can be separated from the liquid reaction medium, washed at least once with an inert hydrocarbon of up to 10 carbon atoms to remove unreacted titanium compounds, and dried. Exemplary of the inert hydrocarbons that are suitable for the washing are isopentane, isooctane, hexane, heptane and cyclohexane.

The final washed product generally has a titanium content of from 1.5 percent by weight to 6.0 percent by weight, preferably from 2.0 percent by weight to 4.0 percent by weight. The atomic ratio of titanium to magnesium in the final product is typically between 0.01:1 and 0.2:1, preferably between 0.02:1 and 0.1:1.

The cocatalyst can be an organoaluminum compound which is selected from the aluminum-based cocatalysts conven-tionally employed with titanium-based procatalysts. Illustrative organoaluminum compounds are trialkylaluminum compounds, alkylaluminum alkoxide compounds and alkyl-aluminum halide compounds wherein each alkyl independently has from 2 to 6 carbon atoms. The preferred organoaluminum compounds are halide-free and particularly preferred are the trialkylaluminum compounds such as triethylaluminum, triisobutylaluminum, triisopropylaluminum and diethylhexylaluminum. Triethylaluminum is especially preferred. The cocatalyst is generally employed in a sufficient quantity to provide a ratio of aluminum atoms to titanium atoms in the pro-catalyst from about 1:1 to about 300:1 but preferably from about 10:1 to about 100:1.

The organoaluminum cocatalyst should generally be employed in sufficient quantity to provide from 1 mole to about 150 moles of aluminum per mole of titanium in the procatalyst. It is preferred that the cocatalyst is present in sufficient quantities to provide from 10 moles to about 100 moles of aluminum per mole of titanium in the procatalyst.

The selectivity control agents which are employed in the production of the olefin polymerization catalyst are those conventionally employed in conjunction with titanium-based procatalysts and organoaluminum cocatalysts. Suitable selectivity control agents include those electron donors as listed above for use in procatalyst production but also include organosilane compounds such as alkylalkoxysilanes and arylalkoxysilanes of the formula $$R'_r Si(OR)_{4-r}$$

wherein R' is alkyl or aryl of up to 32 carbon atoms inclusive, R is lower alkyl of up to 4 carbon atoms and r is 0 to 3.

Illustrative of the suitable selectivity control agents are esters such as ethyl p-ethoxybenzoate, diisobutyl phthalate, ethyl benzoate and ethyl p-methylbenzoate, and organosilanes such as diisobutyldimethoxysilane, n-propyltrimethoxysilane, isopropyltrimethoxysilane, ethyltriethoxy-silane, octadecyltriethoxysilane, octadecyltrimethoxysilane, and cyclohexylmethyldimethoxysilane. The selectivity control agent is typically provided in a quantity sufficient to provide from about 0.01 mole to about 100 moles per mole of titanium in the procatalyst. It is preferred that the selectivity control agent is provided in a quantity sufficient to provide from about 0.5 mole to about 70 moles per mole of titanium in the procatalyst, with about 8 moles to about 50 moles being more preferred.

The manner by which the solid procatalyst precursor, tetravalent titanium halide, the optional inert diluent and the electron donor are contacted is material but not critical and is generally conventional. In one embodiment the procatalyst precursor and the tetravalent titanium halide are mixed and the electron donor is subsequently added to the resulting mixture. In another embodiment, the electron donor and procatalyst precursor are mixed with the tetravalent titanium halide or a mixture of tetravalent titanium halide and optional inert diluent and the resulting solid is contacted one or more additional times with tetravalent titanium halide or the mixture of tetravalent titanium halide and optional inert diluent. The initial contacting of electron donor, procatalyst precursor and tetravalent titanium halide or the tetravalent titanium halide/optional inert diluent mixture is suitably conducted at a temperature from about ambient to about 150° C. Better interaction of these materials is obtained if they are heated and initial contacting temperatures from about 70° C. to about 130° C. are preferred, with temperatures from about 75° C. to about 110° C. being more preferred.

During each contacting with tetravalent titanium halide a portion of the inert diluent is optionally present and the reaction is facilitated on some occasions by the additional presence of an acid halide such as benzoyl chloride or phthaloyl chloride. The solid procatalyst, usually obtained as spherical particles, is typically finished by a final wash with an inert hydrocarbon of up to 10 carbon atoms and drying under nitrogen. Exemplary of the inert hydrocarbons that are suitable for the washing are isopentane, isooctane, hexane, heptane and cyclohexane.

The particular type of polymerization process utilized is not critical to the operation of the present invention and the polymerization processes now regarded as conventional are suitable in the process of the invention. The polymerization is conducted under polymerization conditions as a liquid phase or as a gas-phase process employing a fluidized catalyst bed or as a gas-phase process utilizing some condensed monomer.

The polymerization conducted in the liquid phase generally employs as reaction diluent an added inert liquid diluent or alternatively a liquid diluent which comprises the olefins, i.e., propylene and butene-1, undergoing polymerization. Typical polymerization conditions include a reaction temperature from about 25° C. to about 125° C., preferably about 35° C. to about 100° C. especially about 75° C. to 90° C. being most preferred, and a pressure sufficient to maintain the reaction mixture in a liquid phase. Such pressures are typically from about 150 psi to about 1200 psi, with pressures from about 250 psi to about 900 psi being preferred. The liquid phase reaction is operated in a batchwise manner or as a continuous or semi-continuous process. Subsequent to reaction, the polymer product can be recovered by conventional procedures. The precise control of the polymerization conditions and reaction parameters of the liquid phase process are within the skill of the art.

As an alternate embodiment of the invention, the polymerization may be conducted in a gas phase process in the presence of a fluidized catalyst bed. One such gas phase process polymerization process is described in Goeke et al, U.S. Pat. No. 4,379,759, incorporated herein by reference, involves a fluidized bed, gas phase reaction. A gas phase process typically involves charging to a reactor an amount of preformed polymer particles, and lesser amounts of catalyst component. The olefins, i.e., propylene and butene-1, to be polymerized, are passed through the particle bed at a rate sufficient to initiate polymerization. The molar ratio of butene-1 to propylene in the gas mixture is typically from 0.01 to 0.30. When a butene-1 and propylene binary random copolymer having 0.5% to 6.5% of butene-1 by weight is to be made, the molar ratio of butene-1 to propylene in the gas phase is typically 0.01 to 0.13, preferably 0.02 to 0.12, with 0.06 to 0.08 being more preferred.

Upon passing through the particle bed, the unreacted gas can be withdrawn from the reactor and recycled together with make-up feed gas. As catalyst is lost through incorporation of minute amounts of catalyst within the polymer product, additional catalyst can be provided to the reactor, often through the use of an inert transport medium such as mineral oil, nitrogen or argon. The reaction temperature is selected to be below the sintering temperature of the polymer particles and can be controlled by an external heat exchanger in a gas cycle loop. Reaction temperatures from about 30° C. to about 90° C. may typically be used, with reaction temperatures from about 50° C. to about 85° C. being preferred, from 50° C. to about 70° C. being more preferred, and from 55° C. to about 65° C. being most preferred. The reaction pressure is generally up to about 600 psi although reaction pressures from about 80 psi to about 600 psi are preferred, with reaction pressures from about 300 psi to about 400 psi being most preferred. The precise control of reaction conditions as well as the addition of catalyst and feed gas and the recycle of unreacted monomer is within the skill of the art.

In both the liquid phase and the gas-phase polymerization processes, molecular hydrogen can be added to the reaction mixture as a chain transfer agent to regulate the molecular weight of the reactor polymeric product. The precise control of reaction conditions, and the rate of addition of feed component and molecular hydrogen is broadly within the skill of the art.

The desired reactor polymeric products can be obtained as particulate matter formed by growth of polymer product on the polymer particles provided to the fluidized bed or as particles formed in the reactor. The polymer particles can be removed from the reactor at a rate which is substantially equivalent to the rate of polymer production and the particles are passed to a subsequent reaction zone or are finished by conventional methods prior to use.

The polymers produced are random copolymers which are generally predominantly isotactic in structure. It is preferred that the random copolymers are at least 70% isotactic in structure, especially at least 85%. Polymer yields are high relative to the amount of catalyst employed. The random copolymer can be binary random copolymer of 1-butene and propylene.

In the first specific embodiment of the present invention, the random copolymers comprise 0.5% to 6.5%, preferably 0.8 to 5.5%, more preferably 1% to 5%, and most preferably 1.3% to 3%, of butene-1 by weight. The random copolymers have one or more of the following characteristics (A) to (H):

(A) A haze, as measured by ASTM D-1003, of up to 3.0%, preferably up to 2.0%, more preferably up to 1.5%, and most preferably up to 1.0%. Haze (degree of cloudiness or milkiness) is a measure of the transparency and is measured as the percentage of light transmittance. The presence of various additives such as silica can adversely affect haze values if the particle size of the silica is larger than the wavelength of the light. Further, the thickness of the film has an affect on the haze value, e.g. as film thickness increases, the haze value increases;

(B) A hexane extractable content at 50° C., as measured according to 21 C.F.R. 177.1520(C)(3.1 and 3.2), of up to 2.6%, preferably up to 2.0%, and more preferably up to 1.5%;

(C) A xylene solubles level at 23° C., measured according to 21 C.F.R. 177.1520, of up to 6%, preferably 5.5%, more preferably up to 4.5%. The xylene soluble portion consists primarily of amorphous (atactic) polymer and semi-crystalline polymer;

(D) A tangent modulus, as measured according to ASTM D882 (1% secant at 0.05 inches/min), of at least 200,000 psi (14,060 kg/cm$^2$), preferably at least 300,000 psi (21,100 kg/cm$^2$), more preferably at least 375,000 psi (26,400 kg/cm$^2$);

(E) A melting point from 144° C. to 158° C., preferably from 148° C. to 158° C., more preferably from 152° C. to 158° C.;

(F) A gloss, as measured according to ASTM D-523 at 60°, from 140 to 155, preferably from 143 to 150, most preferably from 145 to 150;

(G) A tensile strength, as measured by ASTM D 638 for machine direction (MD), of at least 17,000 psi, preferably at least 22,000 psi and most preferably at least 25,000 psi; and (H) An elongation at break from 80% to 200%.

Such random copolymers when produced by typical gas phase processes will usually have melt flows, expressed in dg/min as determined by a conventional test procedure such as ASTM-1238, Cond. L, of from about 1 to about 4, preferably from about 1.5 to about 3.9, and more preferably from about 2.0 to about 3.0. Optical properties of the random composition copolymer are improved with higher melt flow.

According to one specific aspect of the first embodiment of the invention, the random copolymer resin is treated with peroxide at elevated temperatures, e.g. above 180° C. Such peroxide treatment procedure, also termed "visbreaking", is well within the skill of the art and can be used to adjust the melt flow of the reactor polymer products as desired.

The visbroken polymer products used in this invention can be obtained by visbreaking the polymer compositions of the present invention that have a melt flow of at least 1.5 dg/min. The melt flow ratio of the resulting visbroken product to the starting non-visbroken polymer product is at least 1.5, preferably at least 2.0, more preferably at least 2.5.

The polymer compositions of this specific embodiment of the invention as well as the visbroken derivatives thereof are characterized by a balance of improved low heat seal initiation temperatures, low hexane extractables, good stiffness, and good optical properties, such as low haze, low yellowing and low bloom.

According to another specific aspect of the first specific embodiment of the invention, the composition incorporates an additive package comprising 0.04% to 0.06% by weight of tetrakis-[methylene(3,5-di-tert-butyl-4-hydroxyhydrocinnamate)]-methane, 0.05% to 0.11% by weight of bis(2,4-di-tert-butylphenyl)-pentaerythritol diphosphite, and 0.01% to 0.04% by weight of magnesium aluminum hydroxy carbonate hydrate, each based on the weight of total copolymer.

The compositions of the first specific embodiment can be further processed by conventional procedures used for the production of biaxially oriented polypropylene films, such as flat biaxial stretching, or tubular biaxial stretching and the like. Stretching temperatures can be from ambient temperature to the melting point of the copolymer, preferably from about 130° C. to about 155° C. The stretch ratio is desirably at least 2:1, preferably at least 5:1, more preferably at least 6:1, most preferably at least 9:1.

According to another aspect of the first specific embodiment of the invention, the random copolymer is used as a base substrate layer with a polymeric heat sealable layer on at least one outer surface of the substrate layer in the production of a film laminate. The substrate layer and the polymeric layer can be coextruded. Other methods can be used including the well-known "Wolfe" process in which prefabricated layers of the polymeric layer are heat bonded to the substrate layer.

The heat-sealable polymeric surface layer can be derived from an ethylene-propylene-butene-1 terpolymer, an ethylene-propylene (EP) random copolymer, a propylene-butene-1 copolymer, an ethylene-butene-1 copolymer, or blends thereof, for example. Suitable terpolymers include those obtained from the random inter-polymerization of from about 1% to about 8% by weight ethylene, preferably from about 3% to about 5% by weight ethylene, with from about 65 to 95 by weight % propylene, preferably from about 86 to about 93% propylene, and butene-1 representing the balance. These terpolymers generally possess a melt index at 230° C. of from about 2 to about 7 and advantageously from about 3 to about 7, a crystalline melting point of from about 100° C. to about 130° C., an average molecular weight of from about 25,000 to about 100,000 and a density from about 0.89 to about 0.92 gm/cm$^3$.

Suitable EP random copolymers for the heat sealable polymeric surface layer generally contain from about 2% wt. to about 7% wt. ethylene, the balance being made up of propylene, a melt index at 230° C., generally ranging from about 2 to about 7 and preferably from about 3 to about 8. The crystalline melting point is usually from about 125° C. to about 140° C. and the number average molecular weight range is from about 25,000 to 100,000. The density is usually from about 0.89 to about 0.92 gm/cm$^3$.

Suitable propylene-butene-1 copolymers for the heat sealable polymeric surface layer generally contain from about 7.0% weight (wt.) to about 15% weight (wt.) butene, the balance being propylene. Such propylene-butene-1 copolymers have (a) a low heat seal initiation temperature, e.g. 105° C. to 140° C., preferably from 105° C. to 110° C.; (b) a haze, of no more than 6%, preferably of no more than 4%; (c) a modulus, as measured according to ASTM D882, of at least 60,000 psi, preferably of at least 80,000 psi; and (d) hexane extractable content at 50° C., as measured according to 21 CFR 177 1530(c) (3.1 and 3.2), of up to 5.5%, preferably 3.5%, with up to 2.6% being more preferred.

In general, where blends of terpolymer and random copolymers are used for the heat sealable polymeric surface layer, the blends will contain from about 10 wt % to about 90 wt % terpolymer and preferably from about 40 wt % to about 60 wt % terpolymer, the balance being made up of random copolymer.

According to another aspect of the first specific embodiment of the invention, the random copolymer composition is suitable for metallization, i.e. metallized random copolymer film. The random copolymer for metallized films has surface tension properties (wetting index) of at least 50 dynes/cm after corona discharge treatment of the film surface. It is preferred that the random copolymer has a wetting index of at least 60 dyns/cm. It is noted that homopolymer films typically have surface tension properties of in the range of 40 to 42 dynes/cm after corona discharge.

Metallization of the random copolymer composition of the first specific embodiment of the present invention can occur using any known metallization process, such as corona discharge or vacuum metallization. The random polymer film can be subjected to corona discharge treatment onto the surface to be metallized, followed by metallizing in vacuum. This corona discharge treatment may be carried out an appropriate time after the formation of the random copolymer, but it is preferred that the metallization treatment occur at a point between the formation of film and film take-up.

It is preferred to carry out the corona discharge so as to give a wetting index of at least 50 dyn/cm, with at least 55 dyn/cm being more preferred. Optionally, an adhesion means is employed to strengthen the adhesion between the random copolymer film and the desired metal. Suitable adhesion means include polyesters, polyurethanes, and epoxy resins. The adhesion means can be coated onto the surface of the random copolymer film to be subjected to corona discharge. The adhesion means, of course, may be employed simultaneously with the metallization.

Any known process for vacuum-metallizing may be employed, typically using apparatus provided with a delivery part, a metallizing part and a take-up part for the film. Atmospheric pressure inside the apparatus is reduced to say about $10^{-4}$ Torr or less by simultaneously employing an oil pump and a diffusion pump. A vessel containing a desired metal such as aluminum or filaments having a desired metal attached thereto, is heated to melt and vaporize the metal. The vaporized molecules of the metal are continuously deposited onto the surface of the delivered film, followed by take-up. The thickness of the metallized layer is usually 0.01 to several microns.

The second specific embodiment of the present invention relates to a polymer composition of (1) a predominantly isotactic random copolymer consisting essentially of from about 0.8% to about 20%, preferably 5% to 18%, more preferably 7% to 14.5%, and most preferably 7.5% to 10.0%, by weight of butene-1 units, and 80% to 99.2% by weight of propylene units; and (2) at least one clarity/gloss enhancing amorphous silica antiblock agent. The resulting polymer product i.e., film, generally has a clarity, as measured according to ASTM D-1746, of at least. 8% and a gloss (60°), as measured according to ASTM D-523, of 129 to 145. Optionally, the polymer composition includes an additive package which reduces yellowing. The synthetic amorphous silica can have, in general, a platy morphology, a relatively high bulk density in the range from 300 to 360 gm/liter, and a low oil absorption in the range from 80 to 100 gm/100 gm. The synthetic amorphous silica antiblock agent is used in an amount ranging from 0.05% to 0.35% by weight of copolymer composition, preferably 0.07% to 0.25% by weight, 0.10 to 0.20% being more preferred, with 0.13 to 0.17% being most preferred.

According to a specific aspect of the second specific embodiment of the present invention, the polypropylene random copolymer composition incorporates an additive package comprising from 0.03% to 0.10% by weight of composition tetrakis[methylene(3,5-di-tert-butyl-4-hydroxyhydrocinnamate)]methane, from 0.05% to 0.11% by weight of bis(2,4-di-tert-butylphenyl)pentaerythritol diphosphite, and from 0.01% to 0.04% by weight of magnesium aluminum hydroxy carbonate hydrate, each based on the weight of total copolymer composition.

The polymer compositions of the second specific embodiment preferably have one or more of the following characteristics (A) to (I):

(A) Elongation at break, as measured according to ASTM D882, in the range of 400% to 2000%, preferably a range of 600% to 1500%, with a range from 700% to 1400% being more preferred;

(B) A hexane extractable content at 50° C., as measured according to 21 C.F.R. §177.1520(c)(3.1 & 3.2), of up to 5.5%, preferably up to 3.5%, up to 2.6% being more preferred, and up to 2.0% being most preferred;

(C) A xylene solubles level at 23° C., as measured according to 21 C.F.R. 177.1520, of up to 13%, preferably up to 6%, with up to 5% being more preferred, and up to 3% being most preferred;

(D) A tensile modulus, as measured according to ASTM D882 (1% secant at 0.05 inches/min), of at least 40,000 psi, preferably of at least 60,000 psi, with at least 80,000 psi being more preferred, and a modulus of at least 100,000 psi being most preferred;

(E) A haze, as measured by ASTM D-1003, of up to 5%, with a haze of up to 3% being preferred, a haze of up to 2.5% being more preferred; haze is a measure of milkiness or cloudiness of the film.

(F) A gloss, as measured according to ASTM D-523 (60°), in the range from 129 to 145, with a range from 131 to 144 being preferred, with a range from 136 to 142.5 being more preferred (gloss correlates with the shininess or sparkle of the film);

(G) A yellowness index of pellets, as measured according to ASTM D-1925, of up to −1.2, preferably up to −0.5, with up to −0.1 being more preferred and up to 0.05 being most preferred;

(H) A clarity, measured by ASTM D-1746, of at least 8%, with a clarity of at least 11% being preferred and a clarity of at least 13% being most preferred. Higher clarity numbers correlate with observance of a clearer image of an object when viewed through a film. Clarity is a measure of the light that is scattered less than 0.1 degree upon passing through the film; and (I) Coefficient of friction (COF), both static and kinetic, measured according to ASTM D-1894, of up to 0.30, with a COF of up to 0.20 being preferred.

The polymer compositions as described above when produced by typical gas phase processes will have melt flows, as determined by a conventional test procedure such as ASTM-1238, Cond. L, of from about 0.8 dg/min to about 50 dg/min. A melt flow of from about 1 dg/min to about 25 dg/min being preferred and from about 3 dg/min to about 20 dg/min being more preferred.

As a specific aspect of the second specific embodiment of the invention, the polymer compositions are contacted at elevated temperatures, e.g., above 180° C., with peroxide. The treatment is termed "visbreaking" and the procedures thereof are within the skill of the art. Visbreaking can be used to increase the melt flow of the reactor polymer product as desired.

The visbroken polymer products of this invention are obtained by visbreaking the polymer compositions of the present invention that have a melt flow of at least 0.8 dg/min. The melt flow ratio of the resulting visbroken product to the starting non-visbroken polymer product is at least 2, a melt flow ratio of 5 is preferred, with a melt flow ratio of 8 being more preferred.

The polymer compositions of the second specific embodiment of the present invention as well as the visbroken derivatives thereof are characterized by an excellent balance of improved low hexane extractables, good gloss, good clarity, low yellowness index and low haze.

These compositions can be processed by conventional procedures used for thermoplastic materials such as extrusion, injection molding and thermoforming and related processes. Among particular applications for the compositions are the production of oriented or unoriented films by casting or film blowing methods. After fabrication, the film can be heat sealed by sealing jaws at a preset temperature, pressure and dwell time. The resulting film has lower heat seal initiation temperatures, low hexane extractables and improved optical properties such as high transparency, high gloss and low yellowness index.

Suitable synthetic amorphous silica antiblock additives include Gasil® AB720, which is available from Crosfield Group of Warrington, England. In contrast, a conventional amorphous silica which is not generally suitable is Sylobloc 48 (W. R. Grace Company); this typically has a bulk density of 128 gm/liter and oil absorption of 220 gm/100 gm, with spheroidal particle morphology.

The copolymer composition of this invention optionally incorporate additives such as processing stabilizers, antioxidants, ultraviolet stabilizers, pigments, acid neutralizing agents, such as magnesium aluminum hydroxycarbonate hydrate, acid acceptors, slip agents, such as erucamide, nucleating agents, mold release agents, and dispersants, acid, if not present, antiblock agents such as amorphous silica which are conventionally employed in commercial polymer compositions provided they do not adversely affect the good optical properties and low yellowness of the compositions.

Examples of processing stabilizers which can be used include bis(2,4-di-tert-butylphenyl)-pentaerythritol diphosphite, tetrakis[2,4-di-tert-butyl-phenyl]4-4'-biphenylylene diphosphonite, tris(2,4-di-tert-butylphenyl) phosphite; antioxidants such as n-octadecyl-3-(4'-hydroxy-3',5'-di-tert-butylphenyl)-propionate, tetrakis-[methylene(3,5-di-t-butyl-4-hydroxyhydrocinnamate) methane, tris(3,5-di-tert-butyl-4-hydroxybenzyl)isocyanurate,pentaerythritol-tetrakis-(β-laurylthiopropionate) and distearyl thiodipropionate.

Typical ultraviolet stabilizers include 2-hydroxy-4-n-octoxy-benzophenone,2-(2-hydroxy-3,5-di-butyl-phenyl)-5-chlorobenzene triazole, dimethyl suc-cinate-2-(4-hydroxy-2,2,6,6-tetramethyl-1-piperidyl)ethanol condensate.

Typical acid acceptors are hydrotalcite DHT-4A, calcium stearate and calcium lactate.

The invention described herein is illustrated, but not limited by the following Illustrative Embodiments and Comparative Examples. The following terms are used throughout the Illustrative Embodiments and Comparative Examples:

SCA (Selectivity Control Agent)
NPTMS (n-propyltrimethoxysilane)
PEEB (ethyl p-ethoxybenzoate)

Illustrative Embodiment I

A.) Preparation of Procatalyst

To a 50/50 solution (vol/vol) of 2953 liters of titanium tetrachloride and chlorobenzene, are added, in succession, 50 kg of diisobutyl phthalate, and 231 kg of carbonized magnesium ethoxide. A temperature of 20° C. to 25° C. is maintained during these additions. The resulting mixture is then heated to 110° C. with stirring, the temperature being maintained for 1 hour. At the end of this time, the mixture is filtered while hot. A solid material is collected.

The solid material is then slurried in a 50/50 (vol/vol) solution of 2953 liters of titanium tetrachloride and chlorobenzene at room temperature. The resulting slurry is then heated to 110° C. with stirring, the temperature being maintained for 60 minutes. At the end of this time, the mixture is filtered while hot. A solid material is collected.

The solid material is reslurried in 2953 liters of the 50/50 (vol/vol) solution. The resulting slurry is heated to 110° C. with stirring and the temperature being maintained for 30 minutes. At the end of this time, the mixture is filtered while hot. A solid material is collected.

The residue is washed once with 2271 liters of isopentane at 25° C. and then dried under a nitrogen purge.

B.) Polymerization

The procatalyst of section A was continuously fed into a gas phase fluidized, bed reactor as a 30% by weight dispersion in mineral oil. Simultaneously and continuously, triethylaluminum and a selectivity control agent ("SCA"= NPTMS) were introduced to the reactor. Sufficient hydrogen was introduced to regulate the molecular weight of the polymer product. A small amount of nitrogen is also present. The partial pressure of propylene was from about 140 psi to about 380 psi. The polymerization temperature was 65° C. and the residence time was from 1½ to 2 hours.

Illustrative Embodiment II

A.) Preparation of Procatalyst

To a 50/50 solution (vol/vol) of 3558 liters of titanium tetrachloride and chlorobenzene, are added, in succession, 51 kg of diisobutyl phthalate, and 150 kg of magnesium diethoxide. A temperature of 20° C. to 25° C. is maintained during these additions. The resulting mixture is then heated to 110° C. with stirring, the temperature being maintained for 1 hour. At the end of this time, the mixture is filtered while hot. A solid material is collected.

The solid material is then slurried in a 50/50 (vol/vol) solution of 3558 liters of titanium tetrachloride and chlorobenzene at room temperature. The resulting slurry is then heated to 110° C. with stirring, the temperature being maintained for 60 minutes. At the end of this time, the mixture is filtered while hot. A solid material is collected.

The solid material is reslurried in 3558 liters of the 50/50 (vol/vol) solution. The resulting slurry is heated to 110° C. with stirring and the temperature being maintained in 30 minutes. At the end of this time, the mixture is filtered while hot. A solid material is collected.

The residue is washed four times with 3785 liter portions of isopentane at 25° C. and then dried under a nitrogen purge.

B.) Polymerization

The procatalyst of section A was continuously fed into a fluidized bed reactor as a 30% by weight dispersion in mineral oil. Simultaneously and continuously, triethylaluminum, as a 5% by weight solution in isopentane, and a selectivity control agent ("SCAA"=NPTMS), as a 0.5 to 5 percent solution in isopentane, were introduced to the reactor. Sufficient hydrogen was introduced to regulate the molecular weight of the polymer product. A small amount of nitrogen is also present. The partial pressure of propylene was from about 140 psi to about 300 psi. The polymerization temperature was 65° C. or 80° C. and the residence time was from 2 hours to about 4 hours.

Comparative Example I

The same procedure used in Illustrative Embodiment I was repeated except ethylene was substituted for butene-1. The results of a series of polymerizations are shown in TABLES 1 and 2.

Comparative Example II (a) Preparation of Procatalyst Component

The procatalyst was prepared by adding magnesium diethoxide (50 mmol) to 150 ml of a 50/50 (vol/vol) mixture of chlorobenzene/$TiCl_4$. After adding ethyl benzoate (16.7 mmol), the mixture was heated in an oil bath and stirred at 110° C. for approximately 30 minutes, the mixture was filtered. The slurry was washed six times with 150 ml portions of isopentane and then dried for 90 minutes, at 30° C., under nitrogen.

(b) Polymerization

Using the above-described procatalyst (section a), propylene and ethylene were polymerized, in the same manner, as described in Illustrative Embodiment I, section (b), except the selectivity control agent was PEEB.

Comparative Example III

Using the procatalyst of Illustrative Embodiment I(a), propylene was polymerized as described in Illustrative Embodiment I, (b).

The resulting copolymer products of Comparative Examples I, II and III were cast into films of various thickness as described in Illustrative Embodiment III. The results are furnished in TABLES 1 and 2.

Illustrative Embodiment III

Film Casting of Polymer Products

Some of the polypropylene products, produced according to Illustrative Embodiments I and II and Comparative Examples I II and III, were recovered by conventional means. Some of the recovered products were mixed with one of the following additives packages:

A) 1000 ppm of Irganox® 1010 hindered phenolic primary antioxidant available from Ciba Geigy Corporation, 1000 ppm of Irgafos® 168 phosphite secondary antioxidant available from Ciba Geigy Corporation, 400 ppm of Hydrotalcite DHT-4A acid neutralizer available from Kyowa Chemical Industry.

B) 500 ppm of Irganox® 1010, 800 ppm of Ultranox® 626 and secondary phosphite stabilizer available from General Electric Specialty Chemicals and 200 ppm of Hydrotalcite DHT-4A.

After the recovered products were mixed with one of the above-described additive packages, some of the resultant mixtures were visbroken with sufficient peroxide to obtain the desired melt flow and then pelletized.

The pelletized polymer products (either visbroken or non-visbroken) were cast into film according to the following procedure:

The pellets were extruded into a 0.05 inch thick sheet using a 2½" diameter extruder (24:1 L/D ratio) at a melt temperature of 250° C.; speed of about 100 rpm, and head pressure of 2,000 psi. A 12" wide die and 13" diameter chill roll with a waterbath with temperatures of 25° C. were used. After the sheet was cooled, it was reheated in the machine direction orientation (MDO) section at 120° C. roll temperatures, and stretched at 5.5:1 ratio. The sheet was then passed through the transverse direction orientation (TDO) section where the preheat section had a temperature of 175° C., the stretching zone had a temperature of 160° C., and the annealing zone had a temperature of 162° C. The web was stretched in the transverse direction at a stretch ratio of 8.5:1.

The "melt temperature" (°C.) is obtained from a differential scanning calorimetry curve for each polymer product produced.

The other properties of the random copolymer composition were measured as follows:

| | |
|---|---|
| Elongation (%) | ASTM D638 (23°C.) |
| Melt Flow | ASTM D1238.78, Cond. L |
| Haze | ASTM D1003 |
| Gloss (at 60°) | ASTM D2457 |
| Modulus (1% secant at 0.05 inches/min) | ASTM D790A |
| Tensile Strength at Break | ASTM D638 |

The results of a series of polymerizations are shown in TABLES 1 and 2.

TABLE 1

| Sample No. | Thickness[f] (mls) | Tangent Modulus (×1000 psi) MD | Tangent Modulus (×1000 psi) TD | Tensile Strength @ Break (×1000 psi) MD | Tensile Strength @ Break (×1000 psi) TD | Elongation @ Break (%) MD | Elongation @ Break (%) TD | Haze | Gloss (60°) |
|---|---|---|---|---|---|---|---|---|---|
| 1[a] | 0.8 | 413.6 | 1053.0 | 18.7 | 61.2 | 151 | 27 | 0.7 | 137.3 |
| 2[b] | 0.9 | 377.4 | 832.2 | 19.7 | 47.8 | 138 | 28 | 0.2 | 150.0 |
| 3[c] | 0.9 | 373.7 | 964.8 | 20.3 | 54.3 | 148 | 28 | 0.1 | 147.1 |
| 4[d] | 0.8 0.7 | 365.9 | 952.2 | 20.5 | 55.8 | 145 | 28 | 0.4 | 141.6 |
| 5[e] | 0.8 | 364.3 | 945.8 | 21.2 | 55.3 | 155 | 28 | 0.6 | 146.6 |

[a]Homopolymer composition prepared according to Comparative Example II.
[b]Butene random containing 1% butene prepared according to Illustrative Embodiment II
[c]Visbroken homopolymer prepared according to Comparative Example III.
[d]Homopolymer composition according to Comparative Example III.
[e]Ethylene random containing 0.5% ethylene prepared according to Comparative Example I.
[f]Film thickness as measured in mils (0.001 inches).

TABLE 2

| Butene (% wt.) | Tangent Modulus ×1000 (psi) MD[a] | Tangent Modulus ×1000 (psi) TD[b] | Tensile strength @ Break ×1000 (psi) MD[a] | Tensile strength @ Break ×1000 (psi) TD[b] | Elongation @ Break (%) MD[a] | Elongation @ Break (%) TD[b] | Haze | Gloss (60°) |
|---|---|---|---|---|---|---|---|---|
| 1%[c] | 378.6 | 552.2 | 25.8 | 45.5 | 107.3 | 34.4 | 0.3 | 140 |
| 2%[c] | 373.0 | 557.6 | 26.9 | 45.5 | 118.3 | 35.8 | 0.2 | 148 |
| 3%[c] | 348.7 | 535.6 | 24.0 | 41.8 | 121.9 | 47.4 | 0.3 | 150 |
| —[d] | 364.6 | 541.8 | 24.6 | 41.3 | 122.0 | 43 | 0.3 | 150 |

[a]Machine direction
[b]Transverse direction
[c]Butene randoms prepared according to Illustrative Embodiment I.
[d]Propylene homopolymer prepared according to Comparative Example III.

Illustrative Embodiment IV

Some of the polymer reactor products, produced according to Illustrative Embodiment I, (propylene/butene-1 random copolymer with about 7% by weight butene-1 and melt flow of 3.4, as measured by ASTM D-1238 Cond. L) were mixed and pelletized with an additive package of Irganox® 1010 (500 ppm) phenolic primary antioxidant available from Ciba Geigy Corporation, Ultranox® 626 secondary phosphite stabilizer available from General Electric Specialty Chemicals (800 ppm), Hydrotalcite DHT-4A acid neutralizer (200 ppm) available from Kyowa Chemical Industry, Kemamide® E erucamide (1000 ppm) available from Witco Corporation, and one of the following antiblock additives:

A) SYLOBLOC® 48 silica antiblock additive available from W. R. Grace (conventional silica).

B) GASIL® AB720 synthetic amorphous silica antiblock additive which is available from Crosfield. The average particle size of each silica was about 4 micrometers.

Compounding was done using a 1¼ inch Brabender extruder with a Maddock mixing screw, under nitrogen and 250° C. melt temperature.

The pellets were extruded into 3.5 mil thick cast film using a ¾ inch Brabender extruder (200° C. melt temperature) with 8 inch wide die and a 10 inch Killion chill roll (15° C.). Operating conditions for all polymer formulations were the same. The test results for the films produced are provided in TABLE 3.

TABLE 3

| PPM[1] | 0 | 1000 A[2] | 1000 B[3] | 1500 A[2] | 1500 B[3] | 2000 A[2] | 2000 B[3] | 3000 A[2] | 3000 B[3] |
|---|---|---|---|---|---|---|---|---|---|
| Haze (%) | 0.65 | 2.4 | 1.5 | 2.7 | 2.1 | 2.5 | 2.5 | 3.2 | 4.9 |
| Gloss (60°) | 147.2 | 132.8 | 144.8 | 129.8 | 142.4 | 131.5 | 134.5 | 125.5 | 130.2 |
| Yellowness index[5] | −1.3 | −1.3 | −1.2 | — | — | −0.96 | −0.03 | — | — |
| COF[4] | | | | | | | | | |
| - Static | 0.223 | 0.257 | 0.229 | 0.229 | 0.234 | 0.231 | 0.230 | 0.282 | 0.232 |
| - Kinetic | 0.188 | 0.200 | 0.197 | 0.191 | 0.204 | 0.207 | 0.202 | 0.244 | 0.201 |
| Clarity (%) | 14.7 | 9.8 | 14.7 | 7.0 | 15.4 | 9.0 | 13.6 | 7.2 | 16.1 |

[1]Parts per million of antiblock agent
[2]Polymer composition incorporating antiblock agent A of Illustrative Embodiment IV.
[3]Polymer composition incorporating antiblock agent B.
[4]Coefficient of Friction
[5]Measured on pellets As noted in TABLE 3, the polymer film compositions incorporating antiblock additive B at various levels exhibit high clarity and higher gloss in comparison to the polymer film using antiblock additive A. It is also noted that the pellets from composition utilizing antiblock B exhibited a yellowness index similar to the pellets using antiblock additive A.

Illustrative Embodiment V

Formulations of Table 4 were compounded as follows. The base resin was propylene-butene random copolymer of nominal 1.5 melt flow and 7.5% w butene comonomer content. This unstabilized powder was compounded with 0.05% w Irganox 1010, 0.08% w Ultranox 626, 0.02% hydrotalcite DHT-4A, 0.15% w silica antiblock agent (Gasil AB 720 or for comparison, Sylobloc 48) and variable levels of Kemamide® E (erucamide) slip agent. Lupersol 101 peroxide (250 ppm) was used in all formulations to chemically crack (or degrade) the powder to 8 melt flow (MF) pellets.

Compounding was done using a 1¼ inch Brabender extruder with Maddock mixing screw under nitrogen at 230° C. melt temperature and 100 RPM screw speed.

The pellets were extruded into 4 mil thick cast film, using a ¾ inch Brabender extruder at 234° C. melt temperature, 65 RPM screw speed, 8 inch wide slot die and Killion chill roll (15° C.).

Table 4 shows the properties of the films produced. The film which incorporated Gasil AB 720 shows higher clarity and higher gloss than film incorporating Sylobloc 48. Also, at a given concentration of slip agent, film incorporating Gasil AB 720 show a lower coefficient of friction (COF) than film that incorporated Sylobloc 48. A lower COF correlates to lower slip additive requirement. This is beneficial, since higher concentrations of slip agent cause plate-out and die deposit in film extrusion operation.

(d) a xylene soluble level at 23° C. of up to about 13%; and (e) an elongation at break of about 80% to about 2000% measured in accordance with ASTM D882.

3. The composition of claim 2, wherein said composition has
a gloss (60°) from 129 to 145.

4. The composition according to claim 1, wherein said copolymer consists essentially of about 5% to about 18% by weight of butene-1 and about 82% to about 95% by weight of propylene.

5. The composition according to claim 1, wherein butene-1 of the copolymer is present in the range from 0.8% to 6.5% by weight of the random copolymer.

6. The composition according to claim 5, having a tensile strength of at least about 17,000 psi (1195 kg/cm$^2$) measured in accordance with ASTM D638, a hexane extractable at 50° C. of up to about 2.6%, a haze of up to about 3%, and a xylene soluble level at 23° C. of up to about 6.0%.

7. The composition according to claim 1, wherein copolymer is prepared by a process comprising contacting propylene and butene-1 under polymerization conditions with a magnesium, titanium-containing catalyst system obtained by contacting (a) a titanium, magnesium-containing procatalyst, (b) an organo-aluminum cocatalyst and (c) an organosilane selectivity control agent.

8. A composition according to claim 1, wherein at least a part of the copolymer is visbroken.

9. A polymer according to claim 8, wherein the visbroken copolymer is prepared by visbreaking a co-polymer having a melt flow of at least about 0.8 dg/min measured in accordance with ASTM D1238, Condition L, such that the melt flow ratio of the visbroken random copolymer to the starting copolymer is at least about 1.5.

TABLE 4

| PPM of Slip Agent[1] | 0 | | 500 | | 1000 | | 1500 | | 2000 | |
|---|---|---|---|---|---|---|---|---|---|---|
| | A[2] | B[3] | A[2] | B[3] | A[2] | B[3] | A[2] | B[3] | A[2] | B[3] |
| COF[4] | | | | | | | | | | |
| - Static | 0.342 | 0.322 | 0.328 | 0.299 | 0.264 | 0.219 | 0.219 | .206 | 0.192 | 0.170 |
| - Kinetic | 0.342 | 0.354 | 0.307 | 0.270 | .207 | 0.182 | .163 | .150 | 0.135 | 0.118 |
| Haze (%) | 1.2 | 1.4 | 1.1 | 1.4 | 1.2 | 1.9 | 1.2 | 1.5 | 1.2 | 1.5 |
| Clarity (%) | 6.8 | 11.3 | 6.9 | 10.7 | 44.9 | 17.9 | 7.5 | 8.4 | 9.7 | 10.1 |
| Gloss (60°) | 124.6 | 142.3 | 127.5 | 143.4 | 137.8 | 139.9 | 135.6 | 141.0 | 133.8 | 142.4 |

[1]Parts per million of slip agent (erucamide).
[2]Polymer composition incorporating Sylobloc 48 antiblock agent (1500 ppm).
[3]Polymer composition incorporating Gasil AB720 antiblock agent (1500 ppm).
[4]Coefficient of friction (metal against film).

It is further observed in Tables 3 and 4, that platy silica provides lower coefficient of friction in film, as compared to conventional silica.

What is claimed is:

1. A composition comprising (1) a copolymer consisting essentially of from about 0.8% to about 20% by weight of butene-1 and from about 80% to about 99.2% by weight of propylene, and (2) from about 0.05%–0.35% by weight of the polymer composition of an amorphous silica having a bulk density from about 300 to about 360 gm/liter and an oil absorption from about 80 to about 100 gm oil/100 gm silica, wherein the composition has a clarity greater than 13%.

2. Polymer composition according to claim 1 having:
   (a) a hexane extractable at 50° C. of up to about 5.5%;
   (b) a haze of up to about 5%;
   (c) a tensile modulus of at least about 40,000 psi measured in accordance with ASTM D882;

10. The composition according to claim 1, further comprising an additive selected from the group consisting of antioxidants, ultraviolet stabilizers, pigments, dispersants, slip agents, neutralizing agents, nucleating agents, processing stabilizers, and mold release agents.

11. The composition according to claim 10, wherein said additive is selected from the group consisting of tetrakis [methylene(3,5-di-tert-butyl-4-hydroxyhydrocinnamate)] methane, bis(2,4-di-tert-butylphenyl)pentaerythritol diphosphite, erucamide and magnesium aluminum hydroxy carbonate hydrate.

12. A film comprising the composition according to claim 1, which is oriented.

13. A film according to claim 12, additionally comprising a second polymeric layer.

14. A film according to claim 13, wherein the second polymeric layer is comprised of a propylene-butene-1 copolymer comprising about 7% to about 15% by weight butene-1.

15. The film according to claim 12, further comprising a metallized layer.

16. The film according to claim 15, wherein the wetting index of the film is at least about 50 N/m (50 dynes/cm).

17. The composition according to claim 9, further comprising at least one additive selected from the group consisting of tetrakis[methylene(3,5-di-tert-butyl-4-hydroxyhydrocinnamate)]methane, bis(2,4-di-tert-butylphenyl)pentaerythritol diphosphite, erucamide and magnesium aluminum hydroxy carbonate hydrate.

18. A process for preparing the copolymer of claim 1, comprising contacting propylene and butene-1 under polymerization conditions with a magnesium, titanium-containing catalyst system obtained by contacting (a) a titanium, magnesium-containing procatalyst, (b) an organoaluminum cocatalyst and (c) an organosilane selectivity control agent.

19. A composition according to claim 1, wherein the melt flow is about 0.8 dg/min to about 50 dg/min, measured in accordance with ASTM D1238, Condition L.

20. A composition according to claim 19, wherein the melt flow is about 1 dg/min to about 25 dg/min, measured in accordance with ASTM D1238, Condition L.

\* \* \* \* \*